United States Patent

Sterly

[15] 3,653,669

[45] Apr. 4, 1972

[54] PAUSE CONTROL MECHANISM FOR A CASSETTE CHANGER

[72] Inventor: Glenn E. Sterly, Carol Stream, Ill.

[73] Assignee: Ampex Corporation, Redwood City, Calif.

[22] Filed: Nov. 10, 1969

[21] Appl. No.: 875,307

[52] U.S. Cl. ..................................274/4 F, 226/50, 274/4 D

[51] Int. Cl. ...............G11b 23/12, G11b 15/24, G11b 15/29

[58] Field of Search ...................274/4 F, 4 E, 4 C, 4 G, 11 C; 242/197–200; 179/100.2 Z, 100.2 R; 353/15

[56] References Cited

UNITED STATES PATENTS

| | | | |
|---|---|---|---|
| 3,050,225 | 8/1962 | Ulman | 179/100.2 |
| 3,359,665 | 12/1967 | Gerry | 274/4 F |
| 3,385,534 | 5/1968 | Staar | 242/200 |
| 3,494,572 | 2/1970 | Uemura | 274/4 E |
| 3,495,835 | 2/1970 | Laa | 179/100.2 Z |

FOREIGN PATENTS OR APPLICATIONS

| | | | |
|---|---|---|---|
| 1,578,053 | 7/1969 | France | 274/4 F |

*Primary Examiner*—Leonard Forman
*Assistant Examiner*—Dennis A. Dearing
*Attorney*—Fitch, Even, Tabin and Luedeka and Robert G. Clay

[57] ABSTRACT

A manually operable play/record selector and pause selector operate a control mechanism in a manner which interrupts a playback or recording operation merely by operation of the pause selector to an operated position and which resumes playback or recording merely by return of the pause selector from the operated position. Preferably, the pause and play/record selectors are push buttons and cause the control mechanism to shift the cassette changer to a pause position, on the one hand, with depression of the pause push button and, on the other hand, with release of a depressed play/record push button to its upper unoperated position. Thus, the cassette changer is in and has a pause position for its normal position.

3 Claims, 6 Drawing Figures

INVENTOR
Glenn E. Sterly

Anderson, Luedeka, Fitch, Even & Tabin ATTYS.

INVENTOR
Glenn E. Sterly

Anderson, Luedeka, Fitch, Even & Tabin ATTYS.

INVENTOR
Glenn E. Sterly

Anderson, Luedeka, Fitch, Even & Tabin ATTYS.

PAUSE CONTROL MECHANISM FOR A CASSETTE CHANGER

This invention relates to a cassette changer apparatus of the kind which automatically transfers cassettes stored in a magazine to an operative position within the changer for playback from or for recording onto a tape stored in the cassette and, more particularly, to a manually operable control mechanism for shifting the cassette changer between an operative playback or recording mode or a standby pause mode of operation.

As cassette changers of this kind may be used in the home by unskilled users, it is important that the operating controls be kept simple and require only a minimum of manipulation. For example, a playback operation should be achieved by operation of a play/record control or selector such as, for example, depression of a play/record push button. Preferably, the interruption of a playback or recording operation should require only a simple movement of a pause selector such as a depression of a pause push button and resumption of play should be obtained merely by releasing the pause push button. Thus, the use of the cassette changer is simplified if a pause is obtained without the first releasing the play/record push button and subsequently depressing the play/record push button to reinstitute playback or recording after a pause. Complicating the achievement of such simple controls is the desirability on one hand, of having the cassette changer shift to a pause position with a depression of the pause push button and, on the other hand, shift to pause a position with a release of the play/record push button. The use of the pause position as a normal position for the cassette changer when not playing back or recording on a tape is desirable from the standpoint that other operations may be immediately instituted, such as, for example, fast wind of the tapes in the cassette without first shifting into the pause position from an operative playback or recording position.

Accordingly, an object of the present invention is to provide a control mechanism for a cassette changer of the foregoing kind which is simple in construction and simple to operate.

Other objects and advantages of the invention will become apparent when taken in connection with the accompanying drawings in which.

Figures 3, 4:
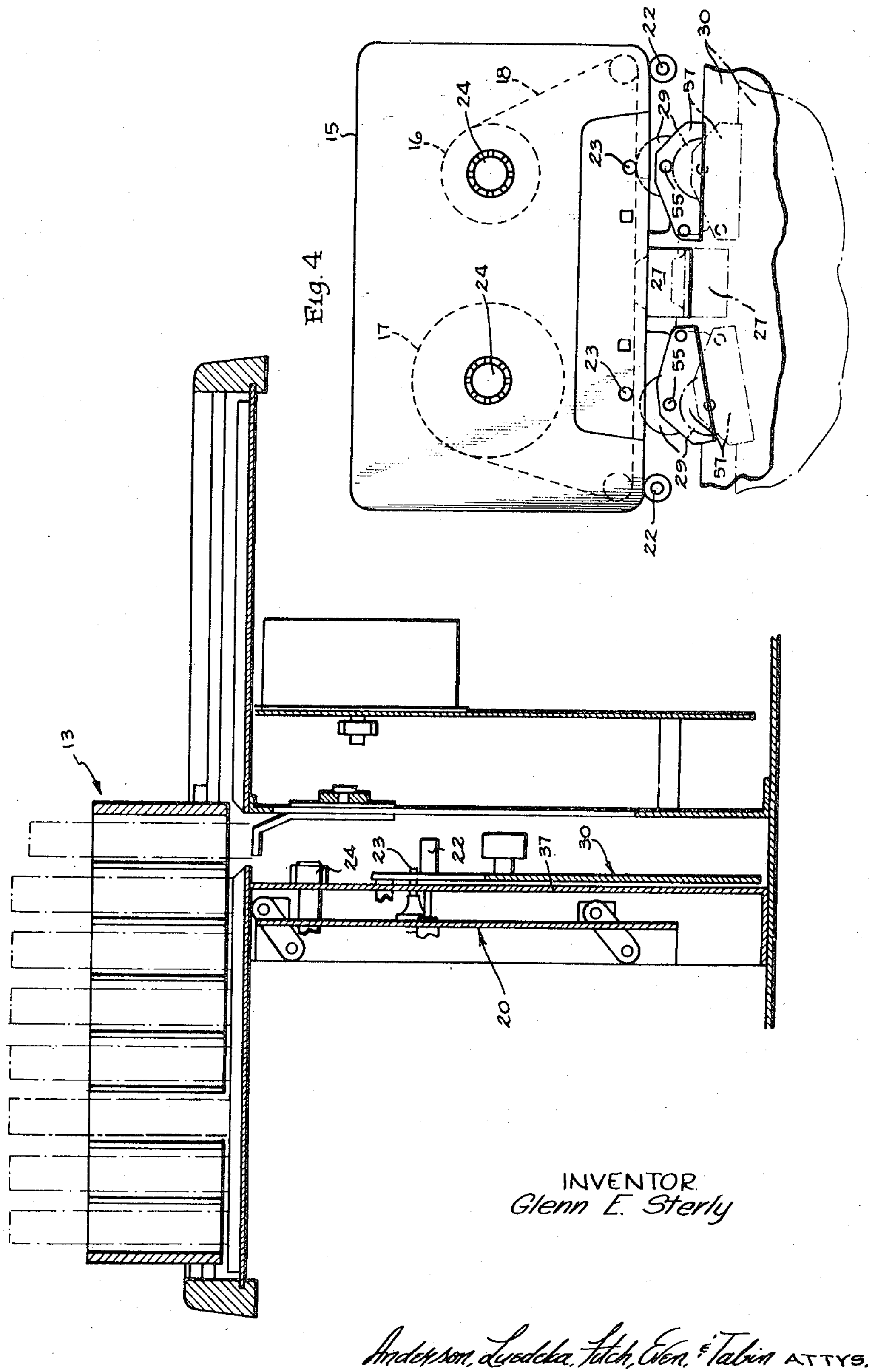
FIG. 3 is a partial, longitudinal, sectional view showing the cassette storing magazine and the cyclically operable means for transferring cassettes to and from the playback or recording station.
FIG. 4 is a diagrammatic view of a cassette and a pause carrier.

As shown in the drawings for purposes of illustration, the invention is embodied in a cassette changer 11 having a magazine 13 in which are stored a series of tape cartridges 15 of the cassette type each having a pair of reels 16 and 17 (FIG. 4) between which extends and on which is wound a tape 18. The cassettes are transferred from the storage magazine to an operative position for playing or recording by means including a movable chassis 20 (FIG. 3) which has a pair of cassette supports in the form of tubes 22 which lower the cassette downwardly while operatively connecting tape feeding means carried thereby with the tape 18. The tape feeding means comprises a pair of capstans 23 which penetrate into the cassette and a pair of spindles 24 which penetrate into the respective tape reels 16 and 17. The normal position of the cassette changer is a standby or pause position, illustrated in phantom lines in FIG. 4, in which the tape 18 is spaced from a sound transducer head 27 and the tape remains stationary because pinch rollers 29, which are positionable to press the tape against a capstan to drive the same, are also spaced from the tape. Thus, the tape remains stationary even though the tape capstans 23 and spindles 24 are inserted into operative driving relationships within the cassette. The sound transducer head and pinch rollers are mounted on a carrier 30 which is shiftable relative to the cassette from the pause position to an operative position illustrated in solid lines in FIG. 4, in which the sound transducer head engages the tape and one of the pinch rollers presses the tape against an associated one of the tape feeding capstans 23.

In accordance with the present invention, only a simple manipulation of a selector or pause push button 31 is required to interrupt a playback or recording operation and then to reinstitute the same operation. More specifically, a control means 32 interconnects the pause push button 31 and a play/record selector or push button 33 in a manner that a playback or recording operation may be interrupted merely by depressing the pause push button and then reinstituted by merely releasing the pause push button. Thus, there is no need to also operate the play/record push button. Yet, as will be explained in greater detail, the control means 32 functions to shift the pause carrier to the operative position with depression of the play/record push button to its upper inactive position. With this type of operation, the pause position is established as the normal position for the cassette changer when the play/record push button is released. Consequently, a fast wind of the tape may be instituted by depression of a fast wind push button 34 without first moving into a pause position and then instituting a fast wind of the tape.

Figure 5:
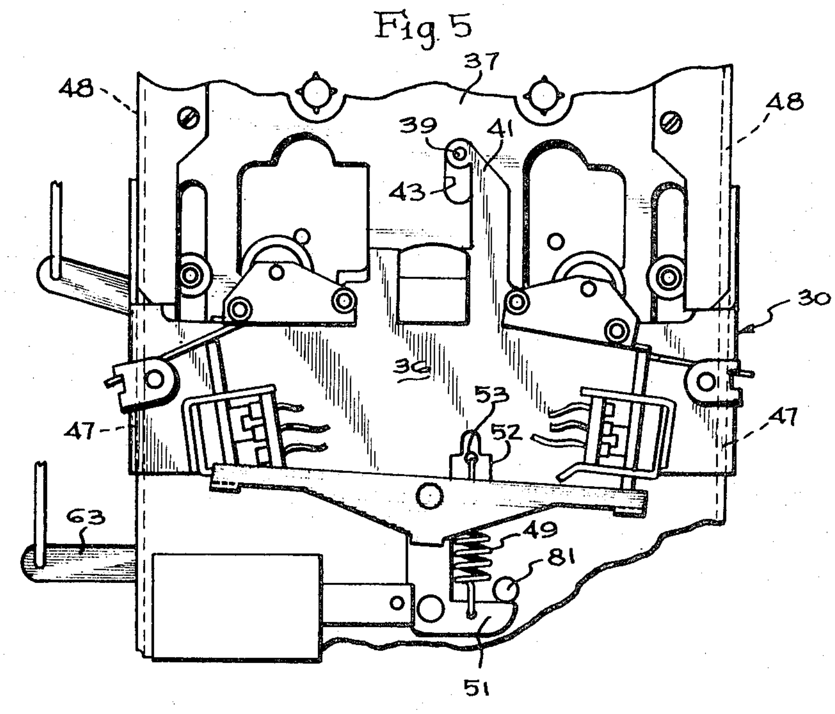
FIG. 5 is a fragmentary, partial view of a pause carrier.
Figure 6:
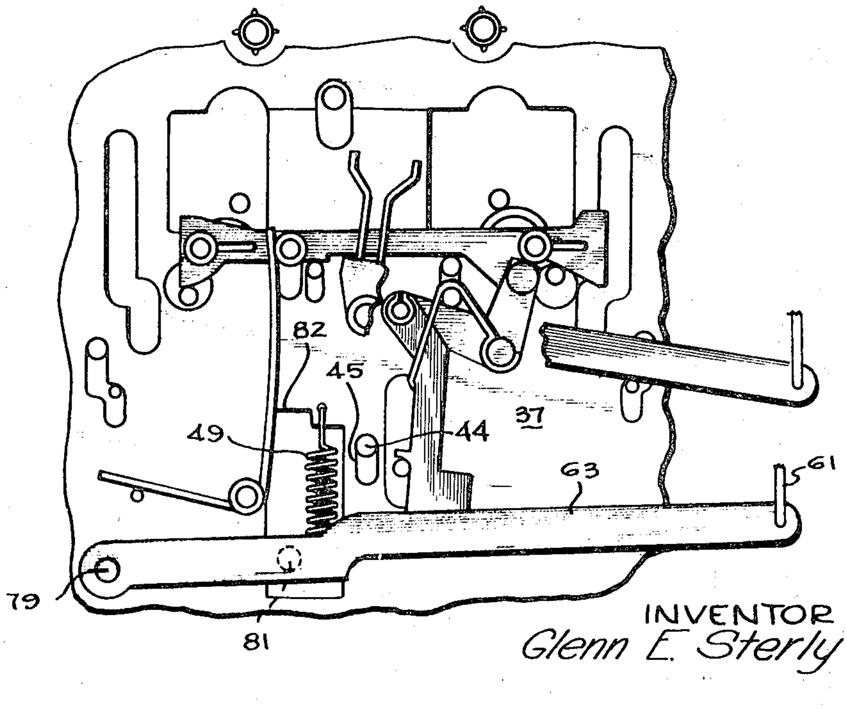
FIG. 6 is a fragmentary partial view of a pause lever for shifting the pause carrier.

Referring now in greater detail to the elements of the invention, the shiftable pause carrier 30 includes a vertically disposed plate 36 which has a central flat portion disposed adjacent and parallel to the stationary, vertical plate or wall 37 of the cassette changer, as best seen in FIG. 5. The pause plate 36 is guided for translation and is accurately located relatively to the cassette by means of an upper guide roller 39 projecting from an upper finger 41 on the pause plate 36 for sliding within a vertically elongated aperture 43 in the stationary wall 37. As best seen in FIG. 6, a lower guide roller 44 is also fastened to the pause plate 36 and is inserted into and constrained for sliding in a lower elongated slot 45 in the stationary wall 37. Along the vertical sides of the pause plate 36 are formed inturned flanges 47 (FIG. 5) which extend adjacent and parallel to similarly inturned, vertical flanges 48 on the sides of the stationary wall 37. Thus, the carrier 30 is guided along a straight line vertical path and is limited in upward or downward movements by the guide rollers 39 and 44 abutting ends of the elongated slots.

The pause carrier 30 is preferably biased into the operative play/record position by means of a contractile return spring 49 which is fastened at its lower end in a spring retainer opening in a laterally extending foot 51, as best seen in FIG. 5, on the lower end of the carrier plate 36. The return spring 49 is positioned within an opening 52 in the pause plate 36 and has its upper end hooked in a hole 53 in the stationary wall 37; and, when permitted as will be explained, the return spring contracts and lifts the pause carrier 30 into the operative position from the pause position.

Figure 1:
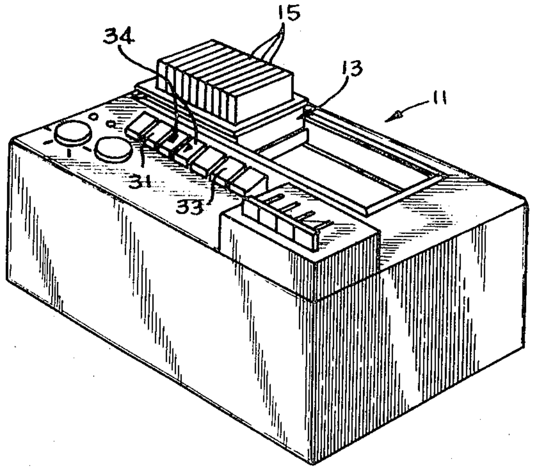
FIG. 1 is a perspective view of a cassette changer apparatus embodying the invention.
Figure 2:
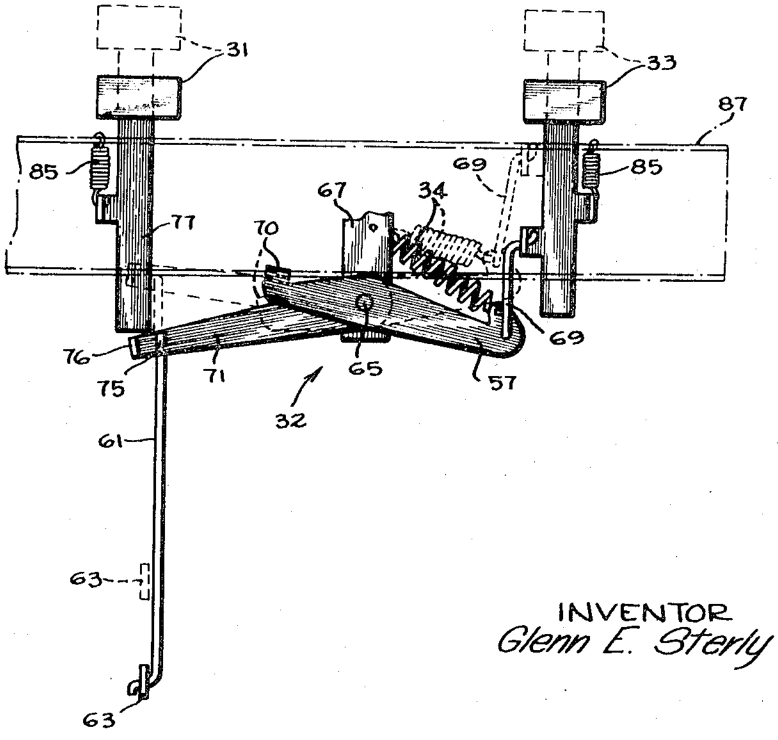
FIG. 2 is a fragmentary, partial view of a control mechanism for the cassette changer apparatus of FIG. 1.

As stated previously, the selective positioning of the pause carrier 30 between the pause position and the operative position is achieved by the control means 32 which is operated by the pause push button 31 or the play/record push button 33, each of which may be depressed from an upper "off" position illustrated in dotted lines in FIG. 2 to a lower operated position illustrated in solid lines in FIG. 2. Also as explained above, it is preferred that the release of the play/record push button 33 results in the shifting of the pause carrier 30 to its downward position at which the return spring 49 is stretched. Briefly, the uplifting bias of the return spring 49 is overriden by the control means which includes a stronger, overriding control spring 34 (FIG. 2) which acts through a play lever 57 and a position control lever 59 to force a link 61 downwardly thereby pivoting a pause control lever 63 down to a position at which the pause control lever holds the pause carrier 30 in the standby mode.

Turning now to the control means 32 in greater detail, the play lever 57 is operated by the play/record selector 33 moving between its depressed and upper positions. More specifically, the play lever 57 is pivotally mounted intermediate its ends on a horizontal post 65 on a stationary bracket 67 with a first end disposed adjacent the play/record selector and connected thereto by a stiff wire link 69. The link 69 has a lower end formed with an offset hook inserted into the play lever and an upper offset hook inserted into the play lever and an upper offset hook inserted into an aperture in the push button selector 33 so that the play lever is turned about the pivot post 65 with vertical movement of the play/record selector. When the play/record selector is in its non-operated upper position, shown in dotted lines in FIG. 2, the play lever 57 is held by the overriding spring 34 in the illustrated dotted line position in which a laterally extending tab 70 thereon abuts the top side of a control lever 71 and holds the same in its lowered position, as illustrated in solid lines in FIG. 2, with the link 61 holding the pause lever 63 down. More particularly, the control lever 71 is also pivotally mounted on the post 65 and has an aperture receiving an offset hook end 75 of the vertically disposed link 61. The control lever 71 is formed with a laterally extending offset 76 which is positioned beneath a lower end of a stem 77 of the pause push button selector 31 for engagement and downward movement thereby when the control lever is in the upper position shown in phantom lines in FIG. 2. More specifically, should the pause push button selector 31 by depressed and the control lever 71 be in the upper phantom line position, its stem 77 will abut the offset 76 and force the control lever 71 down and thereby cause the link 61 and pause lever 63 to also go down and place the pause carrier 30 in the pause position. As stated above, when the cassette changer is at rest with both the push button selectors 31 and 33 in their upper non-operated positions, the play lever 57 will be urged by its strong overriding spring 34 to abut its tab 70 on the control lever 71 and force the latter downward thereby forcing the link 61 and pause lever 63 down with the result that the pause carrier 30 is also in the standby position.

Should it be desired to commence playing or recording, a depression of the play/record selector 33 acts through its attached link 69 to pivot the play lever 57 to lift its tab 70 from the control lever 71 whereby the pause carrier return spring 49 may lift the pause carrier 30 and act through the pause carrier lever 63 and link 61 to pivot the control lever 71 upwardly to the phantom line position illustrated in FIG. 2 in which the pause lever 63 will also be in the upper dotted line position.

As best seen in FIGS. 5 and 6, the pause lever 63 is pivotally mounted at its opposite end from the link 61 on a horizontally disposed pivot stud 79 fixed to the stationary wall 37. The pause lever is disposed in a vertical plane behind and parallel to the plane of the stationary wall 37 and is provided with an actuating pin or stud 81 projecting laterally through the opening 82 in the stationary wall 36 into overlying and abutting relationship with the upper edge of the foot 51 of the carrier plate 36. The actuating pin 81 engages the foot 51 at a position closely adjacent to the point at which the return spring 49 exerts its return force and this point is generally centrally of the carrier and its guiding flanges 47. This facilitates straight line, non-binding translatory movement of the carrier 30 toward the pause position with downward pivotal movement of the pause lever 63.

As is more fully explained in copending application entitled "Cassette Lowering and Release Mechanism", Ser. No. 875,045, filed of even date, which is hereby incorporated by reference as fully reproduced herein, both the pause selector and the play/record selector have a separate latch mechanism (not shown) which automatically latches the same in a depressed operative position in which the selector remains until released. The operated selector is readily released by a further slight depression thereof whereby the selector is unlatched and may be returned upwardly by a spring 85 connected to a bracket 87 in which the push button selectors 31 and 33 are mounted and guided for vertical translational movement.

From the foregoing, it will be seen that the pause carrier is readily shifted to the pause position while the play/record selector remains in the operated position to reinstitute a playback or recording operation with return of the pause selector to its unoperated position. The play/record selector is also operable through a unique control means to shift the pause carrier to the pause position when the play/record selector is in its unoperated position.

While a preferred embodiment has been shown and described, it will be understood that there is no intent to limit the invention by such disclosure but, rather, it is intended to cover all modifications and alternate constructions falling within the spirit and scope of the invention as defined in the appended claims.

What is claimed is:

1. In a cassette changer apparatus for cassettes having a pair of tape reels between which a tape is wound or unwound, the combination comprising a magazine for storing a series of cassettes, means for automatically shifting said magazine and for releasing the cassettes therein for transfer to a playback or recording operative position in said cassette changer, means for transporting individual ones of said cassettes from said magazine to said operative position and including a shiftable chassis having tape spindles for penetrating the tape reels and tape capstans for positioning adjacent the tape, a transducer head for operative association with said tape, forward and reverse tape pinch members each selectively positionable with one of said capstans for causing the tape to be transported in a forward or a reverse direction, a shiftable carrier carrying said transducer head and said tape pinch members between an inoperative standby pause position in which said transducer head and pinch members are spaced from said tape and an operative position for association with said tape, means biasing said carrier to said operative position, control means positionable in a first position to hold said carrier in a normal standby pause position against the urging of said biasing means, said control means being positionable in a second position to allow said biasing means to shift said carrier to said operative position, a first manually operable push button selector depressible to a depressed condition for causing a playback or recording operation and for positioning said control means in said second position to allow said biasing means to shift said carrier to the operative position, a manually operable push button pause selector depressible for shifting said control means to said first position while said first selector remains in its depressed condition thereby shifting said carrier to said standby pause position, said manually operable pause selector being releasible and said first selector holding said control means at said second position to resume playback or recording as said first selector is still in its depressed condition, said control means comprising a control lever means connected to said carrier and operable by said pause push button selector to shift said carrier to said standby position against the urging of said carrier biasing means, a play lever means operably connected to said control lever means and to said first push button selector, and an overriding biasing means of greater force than said carrier biasing means connected to said play lever means and operable through said control lever and said play lever means to shift said carrier to the standby position when said first push button selector is released from its depressed position, said first push button selector in its depressed condition actuating said play lever means to a position to remove from said control lever means the force of said overriding biasing means and allowing said carrier biasing means to shift said carrier to its operative position, said pause push button selector operating said control lever means, upon depression thereof, to force said carrier to said standby position independently of the position of said play lever means and said first push button selector.

2. An apparatus in accordance with claim 1 in which a lost motion connection is provided between said play lever means and said control lever means to permit operation of said control lever means by said pause push button selector independently of operation of said play lever means.

3. An apparatus in accordance with claim 2 in which said play lever means comprises a play lever pivotally mounted for turning about a pivot axis and said control lever means comprises a control lever pivotally mounted coaxially with said control lever and in which said lost motion connection comprises a tab on said play lever overlying said control lever to abut and to pivot the latter to position said carrier in the stand-by position with release of said first push button selector, said tab being spaced from said control lever when said pause push button selector is depressed to join said first push button selector in a depressed condition.

* * * * *